United States Patent
Squier et al.

(10) Patent No.: US 7,294,380 B2
(45) Date of Patent: *Nov. 13, 2007

(54) FILM FOR LABELS THAT ARE REMOVABLE

(75) Inventors: Jo Ann H. Squier, Bloomfield, NY (US); Robert E. Touhsaent, Fairport, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 516 days.

This patent is subject to a terminal disclaimer.

(21) Appl. No.: 10/855,190

(22) Filed: May 27, 2004

(65) Prior Publication Data

US 2004/0219321 A1    Nov. 4, 2004

Related U.S. Application Data

(63) Continuation-in-part of application No. 10/330,510, filed on Dec. 27, 2002, now Pat. No. 6,844,041.

(60) Provisional application No. 60/477,248, filed on Jun. 10, 2003.

(51) Int. Cl.
*B32B 9/00* (2006.01)

(52) U.S. Cl. .................. 428/40.1; 283/81; 283/101; 283/109; 428/41.3; 428/41.5; 428/41.9; 428/42.1; 428/353; 428/354; 428/515; 428/520

(58) Field of Classification Search .............. 428/40.1, 428/41.3, 41.5, 41.9, 42.1, 353, 354, 515, 428/520; 283/81, 101, 109
See application file for complete search history.

(56) References Cited

U.S. PATENT DOCUMENTS

| | | | |
|---|---|---|---|
| 5,422,377 A | 6/1995 | Aubert | |
| 5,663,288 A | 9/1997 | Shinoda et al. | |
| 5,851,662 A | 12/1998 | Suzuki et al. | |
| 5,866,634 A | 2/1999 | Tokushige et al. | |
| 6,156,929 A | 12/2000 | Chandler et al. | |
| 6,235,825 B1 | 5/2001 | Yoshida et al. | |
| 6,306,242 B1 | 10/2001 | Dronzek | |
| 6,322,883 B1 | 11/2001 | Williams | |
| 6,326,440 B1 | 12/2001 | Terada et al. | |
| 6,495,231 B2 | 12/2002 | Benoit et al. | |
| 6,517,664 B1 | 2/2003 | Dronzek, Jr. | |
| 6,844,041 B2 * | 1/2005 | Squier et al. .............. | 428/40.1 |
| 2001/0035265 A1 | 11/2001 | Dronzek | |
| 2002/0146520 A1 | 10/2002 | Squier et al. | |
| 2003/0039775 A1 | 2/2003 | Kong | |
| 2003/0102080 A1 | 6/2003 | Mallik | |

FOREIGN PATENT DOCUMENTS

| | | | |
|---|---|---|---|
| EP | 681 913 | | 11/1995 |
| JP | 2001-151907 | * | 6/2001 |
| WO | WO 02/081205 | | 10/2002 |
| WO | WO 02/081206 | | 10/2002 |
| WO | WO 03/010228 | | 2/2003 |
| WO | WO 03/016053 | | 2/2003 |
| WO | WO 03/092994 | | 11/2003 |

* cited by examiner

*Primary Examiner*—Nasser Ahmad
(74) *Attorney, Agent, or Firm*—Darryl M. Tyus; Rick F. James

(57) ABSTRACT

Clear and opaque polymeric film structures for providing clear and opaque labels that are removable, respectively. The film structure includes a core layer and first skin layer, wherein the first skin layer contains a polymeric matrix of a material that allows a label, which has been produced from the film structure and applied onto a container or product, to be removed from the container or product by the solution employed in a process for re-using the container. The first skin layer is co-extruded along with the remainder of the layers of the film structure, or the first skin layer is deposited on the film structure as an emulsion or extrusion coating. The first skin layer can be contacted with a water-based adhesive to affix the label onto a particular product or product container. Labels produced from the film structure exhibit a desirable combination of excellent initial adhesion strength, moisture resistance and delaminatability, as well as excellent removability.

11 Claims, No Drawings

FILM FOR LABELS THAT ARE REMOVABLE

CROSS REFERENCE TO RELATED APPLICATION

This application claims benefit to U.S. provisional application No. 60/477,248 filed on Jun. 10, 2003. In addition, this application is a continuation-in-part application to U.S. nonprovisional patent application Ser. No. 10/330,510, filed on Dec. 27, 2002 now U.S. Pat. No. 6,844,041 and claims priority and benefit to said U.S. Ser. No. 10/330,510.

BACKGROUND OF THE INVENTION

The invention generally relates to a film used to provide labels that are removable, and more specifically but without limitation, to a film used to provide patch labels that are removable, including both clear and opaque patch labels, to be used with a water-based adhesive.

Glass or plastic bottles and other containers exist in a large variety of sizes and shapes for storing a multiplicity of materials including motor oil, detergents, food and drink, and more. Given the variety of end-uses, it is often desirable to place a label on the container to advertise and promote, or simply identify the ingredients of, the product therein.

Throughout the years, a number of materials have been used to provide labels for containers, including many types of paper and polymer film. There are many factors to consider when choosing between paper and polymer film, or between types of paper or types of film, as the material for making a label.

Depending on the intended application, one factor in choosing a material to make a label is the desired properties of the label, including durability, moisture resistance, curl resistance, abrasion resistance, initial adhesion strength, or the ability to delaminate (sometimes referred to as "fiber tear"). Another factor is the compatibility of the label with the intended adhesive. The final choice of material is often a fine balance between cost and the capability of the selected material to possess the desired properties for the particular end-use in mind (labels for glass v. plastic containers; labels for cold temperature v. room-temperature or warm temperature environments; labels for humid v. dry environments).

Recently, a new factor has emerged that impacts the choice of material for labels. Re-usable containers, such as re-usable beverage bottles, are a hot commodity in European markets, and are gaining in popularity in the North American market. It is becoming increasingly important for containers to be both re-usable and re-cyclable and for the labels thereon to function accordingly, in particular with respect to bottles and other containers for the beverage market.

While re-cyclable containers are simply crushed prior to the re-cycling process, a container that is both re-usable and re-cyclable must be able to withstand several cycles of cleaning and refilling prior to being crushed and entering the re-cycling process. In addition, the label(s) on a container that is returned for re-use must be able to be completely removed in a solution, e.g., a warm caustic solution, in order for the container to be cleaned and refilled. Of course, the label of a re-usable container must also be able to maintain other desired properties, such as strong initial adhesion strength, moisture resistance, and delaminatability.

A paper label attached to a container, such as a beverage bottle, by a water-based adhesive can be relatively easily and completely removed by submerging the container in a caustic solution. Paper is the standard in the industry and typically demonstrates removability in less than three minutes in hot caustic solution. There are disadvantages to using paper labels, however, including the fact that their physical characteristics tend to deteriorate in a high humidity environment, among other disadvantages.

Many polymer film labels possess a strong resistance to moisture. Due to the inherent barrier properties of their polymer composition, the polymer film labels presently known in the art cannot be easily and completely removed from a container simply by submerging the labeled container in a hot caustic solution, as compared to paper labels.

U.S. Pat. No. 6,517,664 to Dronzek, Jr. discloses a technique for labeling a container or surface with a polymer label. The disclosed labels are adapted to facilitate the re-cycling process. The adaptation in the '664 patent, however, concerns the selection of a low density polymer material to provide the label, wherein the disclosed polymer material has a density within a particular range and is specifically chosen from among polyethylene, polyester, polystyrene, polycarbonate, and compatibilized polymer blends.

U.S. Pat. No. 6,306,242 to Dronzek and U.S. Patent Application Publication 2001/0035265 to Dronzek both disclose techniques for labeling a container with a polymer label, wherein the label does not have to be removed from the container in order to re-cycle or re-grind the post-consumer container.

Films comprising a polylactic acid-type polymer are known. For example, U.S. Pat. Nos. 6,326,440 to Terada, et al., 6,235,825 to Yoshida, et al., U.S. No. 6,156,929 to Chandler, et al., 5,866,634 to Tokushige, et al., U.S. Pat. Nos. 5,663,288 to Shinoda, et al., U.S. Pat. No. 5,851,662 to Suzuki, et al., and U.S. Pat. No. 5,422,377 to Aubert each discloses a resin composition containing a polylactic acid-type polymer for forming biodegradable films or breathable and hydrolyzable films. None of the patents, however, discloses a polymer film structure for making labels, wherein an outer layer of the film structure (i) contains a polylactic acid polymer and (ii) is adapted to contact a water-based adhesive.

There exists a need for a polymer film structure for making labels, wherein the polymer film labels can be easily and completely removed from a corresponding bottle or other container by submerging the container in a solution as part of a process to re-use the container. There further exists a need for both clear and opaque embodiments of the labels that are removable. There still further exists a need for polymer film labels that combine removability with excellent initial adhesion strength, moisture resistance, and delaminatability.

SUMMARY OF THE INVENTION

There is provided a clear, polymeric film structure for producing clear labels that are removable. The clear, polymeric film structure comprises a clear, non-cavitated polymeric core layer and a clear, non-cavitated first skin layer comprising a polymer material that allows the entire film structure to be removed from a container by a re-using process when the film structure has been applied onto the container as a label.

There is also provided an opaque polymeric film structure for producing opaque labels that are removable. The opaque, polymeric film structure comprises a polymeric core layer and a first skin layer comprising a polymer material that allows the entire film structure to be removed from a container by a re-using process when the film structure has been applied onto the container as a label, wherein one or both of the core layer and first skin layer are cavitated.

With both clear and opaque embodiments, (i) the first skin layer may be co-extruded with the core layer and any other layers of the film structure, or it may be coated onto the film structure as an emulsion or extrusion coating, (ii) the first skin layer is suitable for being contacted with a water-based adhesive, and (iii) labels produced from the film structure exhibit a desirable combination of excellent initial adhesion strength, moisture resistance and delaminatability, as well as excellent removability.

DETAILED DESCRIPTION OF THE INVENTION

Initial adhesion strength (initial "tack" or initial "tack-up") is defined herein as the ability of a label to maintain (not move from) a desired position on a bottle or other container while under the application of stress (e.g., the stress applied to the label by the working of the bottling line), immediately after applying the label onto the desired position with an adhesive.

Initial adhesion strength can be measured by performing a test, such as applying a label to a container (e.g., a bottle) with an adhesive (e.g., a water-based adhesive such as a cold-glue adhesive) and attempting to manually slide the label across the container immediately thereafter, i.e., before the adhesive has had a chance to dry or fully dry. A label performs best when it is able to lock into position without at all moving. On the other hand, a label performs most poorly when it essentially slides right off the container. Incidentally, once the adhesive fully dries, the label is expected to be fully locked into position. Labels produced from film structures of the invention exhibit acceptable to superior initial adhesion strength.

Moisture resistance is generally self-explanatory. Polymeric film structures according to the present invention must be able to provide a label that can resist the foreseeable moisture that will be present under the conditions in which the container or product to be labeled can reasonably be expected to be stored prior to use.

According to a preferred embodiment of the invention, however, the film structures will be used to provide patch labels for beverage bottles, e.g., beer bottles. The beverage bottle industry specifically desires a label for its bottles that can withstand immersion in an ice chest for up to forty-eight (48) hours. The standard is intended to mimic the actions of potential consumers who may store the labeled bottles in a cooler prior to an event. Labels produced from film structures of the invention are held to, and meet, this stringent industry standard.

Delamination (sometimes referred to as "fiber tear") is defined herein as internal separation of a film structure. In particular, delamination refers to the separation of the first skin layer from the other layers of the film structure when the structure has been pulled or peeled off the container or product to which it has been adhered as a label.

Delamination occurs because the cohesiveness (the resistance to being pulled or peeled apart) between the first skin layer and the adhesive for adhering the label to the container or product is greater than the cohesiveness between the first skin layer and the layer of the label immediately adjacent to the first skin layer, be it the core layer or any other layer (e.g., a tie layer). To delaminate from the film structure, the first skin layer must exhibit higher cohesion with the adhesive than with the other layers of the structure, even if the adhesive has only reached a gel state and/or has not fully dried. Accordingly, when the adhesive reaches a gel state or is at least partially dry, the cohesive bond between the adhesive and the first skin layer should already be greater than the cohesive bond between the first skin layer and the layer of the label immediately adjacent to the first skin layer.

Labels that can, when pulled or peeled off, maximize the percentage of the first skin layer remaining adhered to the container or product, i.e., labels that exhibit maximum fiber tear, are desired by the beverage bottle industry. For example, during manufacture the adhesive may quickly dry around the edges of a label, but slowly dry or never fully dry at the center of the label such that it remains somewhat tacky at the center. If an end-user attempts to pull or peel off the label from the surface of the particular container or product, it is desirable for as much of the first skin layer as possible to delaminate from the label and remain adhered to the container surface via the adhesive. In this way, the first skin layer prevents the end-user from being able to contact any remaining wet adhesive.

Delaminatability can be measured by a visual test. According to one example of a test, a label is fixed on a beverage bottle using a cold-glue adhesive and cured for two weeks in a cold room at 38° F. After the two-week period, the label is peeled off from the bottle to determine how much of the first skin layer delaminates from the film structure and remains adhered to the bottle with the cold glue. If more than 50% of the first skin layer delaminates and remains on the bottle, the label is said to exhibit acceptable fiber tear. A label with unacceptable fiber tear would leave less than 50% of the first skin layer on the bottle. Labels produced from film structures of the invention exhibit acceptable to superior fiber tear.

The delaminatability of a label should not be confused with the removability of a label. As defined herein, removability refers to whether, and to what extent, a label can be removed from a container by submerging the container in a solution, e.g, a warm or hot caustic solution, as part of a process of cleaning and refilling the container to permit its re-use.

Ideally, the label (including the first skin layer) of a re-usable container can be completely removed with no residue being left behind on the surface of the container. For example, shortly after being submerged in the solution, the first skin layer can soften, weakening the interface between the first skin layer and adhesive and permitting the entire label (including the first skin layer) to slide right off the container. The shorter the amount of time the labeled container must remain in solution before the label can be removed and the more complete the removal of the label is, the more acceptable the label's removability. Labels produced from film structures of the invention exhibit acceptable to superior removability.

In short, labels produced from polymeric film structures of the invention exhibit a desirable combination of initial adhesion strength, moisture resistance and delaminatability, as well as removability. Although the labels' performance is somewhat dependent on the properties and performance of the chosen adhesive, the particular composition and arrangement of layers of the present film structures are the major factors influencing performance.

The polymeric film structures for producing labels that are removable comprise a core layer that has a first and second side. The core layer comprises a polymeric matrix comprising any of the film-forming thermoplastic polymers. Examples of suitable film-forming polymers include, but are not limited to, the polyolefins, such as polypropylene (especially propylene homopolymers and propylene-containing copolymers and terpolymers) and polyethylene. In a preferred embodiment, the core layer comprises a polymer matrix comprising an isotactic polypropylene, for example, PP 4712, an easy-processing-grade isotactic polypropylene available from ExxonMobil Chemical Company (Houston, Tex.).

The polymeric film structures for producing labels that are removable also comprise a first skin layer that has a first and second side. The first skin layer comprises a polymeric matrix of a material that allows a label, which has been produced from the film structure and applied onto a container or product, to be removed from the container or product by the solution employed in a process for re-using the container. The adhesive for adhering a label produced from the film structure to a container or product is applied to the first skin layer.

In some embodiments, the polymer material of the first skin layer has a high affinity for water. In other embodiments, the polymer material of the first skin layer is water-soluble. In still other embodiments, the polymer material of the first skin layer has a high water vapor transmission rate (WVTR). In further embodiments, the polymer material of the first skin layer contains one or more functional groups selected from the group consisting of hydroxyl, ester, and amide functional groups. In still further embodiments, the polymer material of the first skin layer is a vinyl alcohol copolymer. In particularly preferred embodiments, the polymer material of the first skin layer comprises polylactic acid polymer (PLA).

PLA is a thermoplastic, high-strength, high-modulus polymer. It belongs to the family of aliphatic polyesters. The basic constitutional unit of PLA is lactic acid, which can be manufactured by carbohydrate fermentation or chemical synthesis, although fermentation processes predominate. Properties of PLA, such as melting point, mechanical strength and crystallinity, are determined by the polymer architecture and the molecular mass. As with other plastics, final user properties will also depend on compound and processing conditions.

PLA can be produced as totally amorphous or up to 40% crystalline. This results in PLA polymers with a wide range of hardness and stiffness values. The glass transition temperature of PLA ($T_g$) preferably ranges from 50° C. to 80° C., while the melting temperature ($T_m$) preferably ranges from 130° C. to 180° C. PLA can be processed by injection molding, sheet extrusion, blow molding, thermoforming, and film-forming. While the choice of PLA for the first skin layer is not limited to any specific PLA, a particular example of a suitable PLA is 4042-D, a polylactic acid polymer available from Cargill-Dow LLC Polymers (Minnetonka, Minn.).

In one embodiment, labels that are removable are provided from a polymeric film structure consisting of only the core layer and first skin layer. In alternative embodiments, labels that are removable are provided from a polymeric film structure that comprises additional layers in addition to the core layer and first skin layer. Alternative film structures may include (i) one or more tie layers between the first skin layer and core layer, (ii) a second skin layer on a side of the core layer opposite the first skin layer, and/or (iii) one or more tie layers between the core layer and second skin layer. According to a particularly preferred embodiment, labels that are removable are provided from a five-layer polymeric film structure containing a core layer, first and second skin layers, and first and second tie layers disposed between the core layer and first skin layer and between the core layer and second skin layer, respectively.

The second skin layer comprises a polymeric matrix comprising any of the film-forming thermoplastic polymers. Examples of suitable film-forming thermoplastic polymers include, but are not limited to, the polyolefins, such as polypropylene (especially propylene homopolymers and propylene-containing copolymers and terpolymers) and polyethylene.

According to one embodiment, the second skin layer is a print-receiving skin layer comprising polypropylene, polyethylene, polybutylene or a polyolefinic copolymer or terpolymer. In a particularly preferred embodiment, the second skin layer is a print-receiving skin layer comprising a propylene copolymer or terpolymer, such as, for example, PP 8573, an ethylene-propylene (EP) random copolymer available from Atofina Petrochemicals (Houston, Tex.), or Chisso 7701, an ethylene-propylene-butylene (EPB) terpolymer available from Chisso Corporation (Tokyo, Japan).

The second skin layer may be surface-treated by various techniques including, for example, flame treatment, corona treatment, plasma treatment or metallization. The second skin layer can be metallized by vacuum deposition, or any other metallization technique, such as electroplating or sputtering. The metal may be aluminum, or any other metal capable of being vacuum deposited, electroplated, or sputtered, such as, for example, gold, silver, zinc, copper, or iron.

The second skin layer can also be coated with a suitable primer coating, e.g., a polyvinylidene chloride (PVdC), acrylic, or silicon oxide ($SiO_x$) coating, which may be used to provide advantages such as enhanced gloss and enhanced compatibility with manufacturing processes and machinery. Priming the second skin layer can also make the label more receptive to printing.

Tie layers comprise a polymeric matrix comprising any of the film-forming thermoplastic polymers. Examples of suitable film-forming thermoplastic polymers include, but are not limited to, the polyolefins, such as polypropylene (especially propylene homopolymers and propylene-containing copolymers and terpolymers) and polyethylene. Tie layers are especially useful where it is desired to maximize the cohesiveness between the core layer and skin layer, i.e., between the core layer and first skin layer and/or between the core layer and second skin layer.

According to a particularly preferred embodiment, a tie layer comprising a polyolefin grafted with a functional group is present between the first skin layer and core layer. For example, ADMER 1179, a maleic anhydride-grafted polypropylene available from Mitsui Petrochemical Industries Ltd. (Tokyo, Japan), may be present between the first skin layer and core layer.

There are both clear and opaque embodiments of the polymeric film structures for producing labels that are removable.

Each layer of the film structure according to the clear embodiment is non-cavitated, and overall, the film structure according to the clear embodiment is essentially free of cavitating agents and opacifying agents. As defined herein, "essentially free of cavitating agents and opacifying agents" means that the film structure, as a whole, contains no more than about 5 wt % of cavitating agents and opacifying agents.

Clear labels that are removable are provided from the clear film structures. "Clear" labels are defined herein as being substantially transparent, e.g., having a haze less than 5% according to ASTM D 1003, preferably less than 2%.

For opaque embodiments, one or more layers of the film structure contain one or more cavitating agents and/or one or more opacifying agents dispersed within the polymeric matrix of the layer. For example, one or both of the core layer and first skin layer may contain a cavitating agent and/or an opacifying agent dispersed within its polymeric matrix. Tie layers may also contain a cavitating agent and/or opacifying agent dispersed within their respective matrices.

Examples of suitable cavitating agents include any organic or inorganic material that is incompatible with (the term "incompatible" is used in the sense that the materials are two distinct phases), and has a higher melting point than, the film-forming polymer of the matrix, at least at the orientation temperature. Specific examples include polybutylene terephthalate (PBT), nylon, an acrylic resin, an ethylene-norborene copolymer, solid or hollow preformed glass spheres, metal beads or spheres, ceramic spheres, calcium carbonate, cyclic olefin polymers and cyclic olefin copolymers (COC's) and combinations thereof. When a layer comprising a cavitating agent is subjected to uniaxial or biaxial orientation, a cavity forms, lending an opaque appearance to the overall film structure.

In a preferred embodiment, Pearl 2, a small particle size calcium carbonate ($CaCO_3$) available from Ampacet USA (Tarrytown, N.Y.), is used as a cavitating agent. Pearl 2 is actually a masterbatch of 30 wt % propylene homopolymer and 70 wt % $CaCO_3$. The $CaCO_3$ particles in Pearl 2 are irregular in shape with a median particle size of 1.5 microns and with the largest particles being as large as 6 to 8 microns. Pearl 2 may be used in any layer of the polymeric film structure, but it is particularly preferred for use in the core layer.

In another embodiment, Pearl 70, a large particle size $CaCO_3$ masterbatch available from Ampacet, is used as a cavitating agent. The Pearl 70 masterbatch is 30 wt % propylene homopolymer and 70 wt % $CaCO_3$, and the $CaCO_3$ particles in Pearl 70 are irregular in shape and have a median particle size of 2.0 microns with the largest particles being as large as 10 microns. Pearl 70 may be used in any layer, but it is particularly preferred for use in the first skin layer.

The exact range for the amount of cavitating agent that can be present in the matrix of a layer can vary widely and should be determined with a particular end-use in mind. Specific range limits are also complicated by the fact that some of the more desirable cavitating agents are available as masterbatches, and masterbatches are available with varying amounts of cavitating agent therein. In certain embodiments, the matrix of a particular layer will contain from 1 to 60 wt %, of a cavitating agent based on the total weight of the layer.

Examples of suitable opacifying agents include iron oxide, carbon black, titanium dioxide, talc, aluminum and combinations thereof. The exact range for the amount of opacifying agent that can be present in the matrix of a layer can vary widely and should be determined with a particular end-use in mind. In certain embodiments, the matrix of a particular layer contains from 1 to 50 wt %, for example from 1 to 25 wt %, of an opacifying agent based on the total weight of the layer.

In order to modify or enhance certain properties of the film structure, it is possible for one or more of the layers to contain dispersed within their respective matrices appropriate additives in effective amounts. Preferred additives include, but are not limited to anti-blocks, anti-static agents, anti-oxidants, anti-condensing agents, co-efficient of friction (COF) modifiers (slip agents), processing aids, colorants, clarifiers, foaming agents, flame retardants, photodegradable agents, UV sensitizers or UV blocking agents, crosslinking agents, ionomers and any other additives known to those skilled in the art.

For example, in certain embodiments, it will be desirable to include a coloring agent, such as a pigment or dye, in one or more of the core layer, a print-receiving second skin layer, and the tie layer between the core layer and print-receiving second skin layer.

As another example, where a film structure includes a second skin layer, the polymer matrix of the second skin layer may include dispersed therein one or more anti-block agents to prevent "grabbing" of the label on machine surfaces and one or more slip agents to provide better slip on heated metal surfaces, thus enhancing machining properties of the label. Specific examples of anti-block agents include coated silica, uncoated silica and crosslinked silicone. Specific examples of slip agents include silicone oils.

In preferred embodiments, each layer of the film structure, including the core layer and first skin layer, is co-extruded, and the film structure is thereafter oriented (uniaxially or biaxially). According to alternative embodiments, each layer of the film structure, except for the first skin layer, is co-extruded and oriented (at least in a first direction), and an emulsion or extrusion coating of the first skin layer is later deposited on the film structure.

Although the orientation may be uniaxial orientation, the film structure is preferably biaxially oriented. The biaxial orientation may be accomplished by either sequential or simultaneous orientation, as is known in the art. In preferred embodiments, the film structure is oriented from four to seven times in the machine direction and from seven to twelve times in the transverse direction.

Following surface treatment (if any) and the application of primers and/or coatings (if any), the polymeric film structure is cut by any method known in the art to provide the desired labels that are removable. According to a preferred embodiment of the invention, the film structure will be used to provide patch labels for beverage bottles, e.g., beer bottles. Removability is especially important for patch labels.

The labels may be any thickness suitable for labeling or packaging applications. Preferably, the labels have a polymer gauge of from about 0.5 mil to about 8 mils, and an optical gauge of from about 1 mil to about 16 mils, e.g., an optical gauge of from about 1 mil to 6 mils. Polymer gauge generally refers to a gauge obtained through measurement of yield units and assumes no voids, whereas optical gauge is typically the standard for cavitated film and can be physically measured, for example, with a caliper gauge, an optical gauge, a microscopic look at the cross-section, scanning electron microscopy (SEM), or Lasermike (available from Beta Lasermike of Dayton, Ohio).

The labels can be fixed to various containers for products, such as bottles, cans, vials, cartons, sachets, pouches, etc., or even to various products themselves. The surface of the container or product may be, for example, glass, plastic, rubber, a synthetic resin, ceramic or any other solid, porous or non-porous material.

The labels are fixed to the container or product surface by use of an adhesive. Preferably, the adhesive is a water-based adhesive such as a cold-glue adhesive.

Cold-glue adhesives generally consist of solid base materials in combination with water. Cold glues can be an aqueous solution of a natural or synthetic adhesive. Cold glues are widely used as an economical alternative to wrap-around or pressure-sensitive labels. Some cold glues are a colloidal suspension of various proteinaceous materials in water and can be derived by boiling animal hides, tendons, or bones that are high in collagen. Alternatively, a cold glue can be derived from vegetables (e.g., starch or dextrin). Some cold glues are based on synthetic materials or resins (e.g., PVA or EVA). Suitable cold glues include HB Fuller® WB 5020 (St. Paul, Minn.), National Starch® Cycloflex 14-200A (Bridgewater, N.J.), AABBITT® 712-150 (Chicago, Ill., Henkel® 10-7026, and Henkel® 7302 (Elgin, Ill.).

The adhesive can be applied directly to the label or it can first be applied to the container or product surface to which the label will be attached. The label can then be placed on the adhesive-coated surface, thereby bringing the label and adhesive into contact with each other. Preferably, the adhesive is applied directly to the label. The first skin layer of the label contacts the adhesive.

The amount of adhesive coverage can vary depending upon the adhesive properties that are desired. A label can be coated with an adhesive over the entire surface of the label. Alternatively, a label can be partially coated with an adhesive to provide sealability over a limited area of the label surface. If the adhesive is to be applied to the surface of the container or product rather than the label, it is preferred that the surface area to be covered by adhesive be not greater than the surface area of the label.

In addition to the embodiments described herein, this invention also comprises methods of preparing such embodiments and methods of labeling containers, including bottles, jars, jugs, vessels, boxes, packages, and other articles, with such embodiments. One method of labeling a container with a polymeric label that is removable, comprises the steps of: (A) obtaining a polymeric film structure that comprises (a) a core layer that has a first side and a second side, wherein the core layer comprises a film-forming thermoplastic polymer, and (b) a first skin layer that has a first side and a second side, wherein the first skin layer comprises polylactic acid polymer (PLA), wherein the polymeric film structure is removable in caustic solution; (B) the step of applying a cold-glue adhesive to the first skin layer or the article to be labeled; and (C) thereafter the step of applying the polymeric film structure to the container to produce a labeled container. Other methods comprise the additional steps of: (D) immersing the labeled container in a caustic solution, such as in a caustic bath or by immersing by spraying the bottle with the solution; and (E) thereafter removing the polymeric film structure from the container. Removing the polymeric film structure is defined broadly to include without limitation, permitting the label to self-detach and float free in the bath of solution, or applying other mechanical or physical effort or energy to assist in label removal and combinations thereof.

Thereby, the container may be recycled or otherwise re-used. Another method of preparing a container for use comprises the steps of: (A) preparing a caustic solution comprising water and a caustic agent, and (B) applying the caustic solution to a container labeled with a polymeric film structure. The film structure comprises (a) a core layer that has a first side and a second side, wherein the core layer comprises a film-forming thermoplastic polymer, and (b) a first skin layer that has a first side and a second side, wherein the first skin layer comprises polylactic acid polymer (PLA). The method further comprises the step of: (C) separating the label from the container; and (D) thereafter recovering the container unlabeled. As stated previously, the step of applying the caustic solution comprises the step of immersing the container in the caustic solution, which includes immersion in a bath as well as immersion by spraying the container with the caustic solution.

The following examples further illustrate the invention without limiting the scope of the invention to the particular materials and conditions employed.

EXAMPLES

The following example five-layer film structures were prepared. In each case, each layer of the film (including the first skin layer) was co-extruded, and the film structure was biaxially oriented. The layers were co-extruded to form a film having a structure of second skin layer (L1)/tie layer (L2)/core layer (L3)/tie layer (L4)/first skin layer (L5).

The film structures of Exs. 1-6 contain cavitated layer(s) and illustrate opaque embodiments of the invention. None of the layers of the film structures of Exs. 7-8 are cavitated, and these film structures are essentially free of opacifying agents. Accordingly, the film structures of Exs. 7-8 illustrate clear embodiments of the invention. The film structures of Comparative Exs. 1-2 contain cavitated layer(s) and represent opaque prior art films.

|        | L1   | L2   | L3                | L4              | L5                |
|--------|------|------|-------------------|-----------------|-------------------|
| Ex. 1  | 8573 | 4712 | 4712 + 7% Pearl 2 | 4612 + 50% Pearl 70 | 4042 + 20% Pearl 70 |
| Ex. 2  | 8573 | 4712 | 4712 + 7% Pearl 2 | 4612 + 50% Pearl 70 | 4042 + 5% Pearl 70 |
| Ex. 3  | 8573 | 4712 | 4712 + 7% Pearl 2 | 1179            | 4042              |
| Ex. 4  | 8573 | 4712 | 4712 + 25% Pearl 2 | 1179           | 4042              |
| Ex. 5  | 8573 | 4712 | 4712 + 25% Pearl 2 | 1179           | 4042 + 1% Pearl 70 |
| Ex. 6  | 8573 | 4712 | 4712 + 25% Pearl 2 | 1179           | 4042D + 10% Pearl 70 |

-continued

|  | L1 | L2 | L3 | L4 | L5 |
|---|---|---|---|---|---|
| Ex. 7 | 8573 | 4712 | 4712 | 80% 1179 + 20% 4042 | 4042 |
| Ex. 8 | 7703 | 4712 + Armo 475 | 4712 | 1179 | 4042D + 1% Pearl 70 |
| Comp. Ex. 1 | 8573 | 4712 | 4712 + 7% Pearl 2 | 4612 + 50% Pearl 70 | 4612 + 50% Pearl 70 |
| Comp. Ex. 2 | 8573 | 4712 | 4712 + 25% Pearl 2 | 4612 + 50% Pearl 70 | 4612 + 50% Pearl 70 |

8573—ethylene-propylene copolymer
4712, 4612—isotactic polypropylenes
4042, 4042D—polylactic acid polymers
Pearl 2, Pearl 70—masterbatches of 30 wt % propylene homopolymer and 70 wt % calcium carbonate ($CaCO_3$)
1179—maleic anhydride-grafted polypropylene
7703—ethylene-propylene-butylene terpolymer
Armo 475—anti-static additive Patch labels were produced from the film structures and applied onto beer bottles with a cold-glue adhesive. The labeled beer bottles were later subjected to the so-called Aluglass test method. The test mimics a beer company's label removal method and is intended to measure a label's removability. The labeled bottle is submerged in a bath of warm caustic solution, and after a predetermined amount of time has elapsed, a tester attempts to remove the label. The shorter the amount of time the labeled container must remain in the bath before the label can be removed and the more complete the removal of the label is, the more acceptable the label's removability.

In the following data, a score on a scale from 1 to 5 has been assigned to the observed removability results. A score of 3 or higher indicates acceptable label removability, with a score of 5 indicating ideal label removability.

Bottles labeled with patch labels produced from film structures of Exs. 1-2 and Comp. Ex. 1 were submerged in a caustic (4.5% NaOH) bath at 65° C. Label removability was tested at the time intervals indicated below. The following results were observed.

|  | 2 minutes | 5 minutes | 7 minutes |
|---|---|---|---|
| Ex. 1 | 5 | 5 | n/a |
| Ex. 2 | 5 | 5 | n/a |
| CE 1 | 1 | 2 | 3 |

Bottles labeled with patch labels produced from film structures of Exs. 3, 5-6, and 8 and Comp. Ex. 2 were submerged in a caustic (4.5% NaOH) bath at 65° C. Label removability was tested at the time intervals indicated below. The following results were observed.

|  | 2 minutes | 7-10 minutes | 15 minutes |
|---|---|---|---|
| Ex. 3 | 1 | 4 (10 minutes) | n/a |
| Ex. 5 | 5 | 5 (7 minutes) | n/a |
| Ex. 6 | 3 | 5 (10 minutes) | n/a |
| Ex. 8 | 3 | 5 (9 minutes) | n/a |
| CE 2 | 1 | 1 (10 minutes) | 1 |

Bottles labeled with patch labels produced from film structures of Exs. 3-5 and 8 and Comp. Ex. 2 were submerged in a caustic (2.0% NaOH) bath at 65° C. Label removability was tested at the time intervals indicated below. The following results were observed.

|  | 5-6 minutes | 8-10 minutes | 12 minutes |
|---|---|---|---|
| Ex. 3 | 5 (6 minutes) | n/a | n/a |
| Ex. 4 | 4 (5 minutes) | 5 (8 minutes) | n/a |
| Ex. 5 | 2 (5 minutes) | 3 (10 minutes) | 5 |
| Ex. 8 | 3 (5 minutes) | 5 (10 minutes) | n/a |
| CE 2 | 1 (5 minutes) | 4 (10 minutes) | n/a |

Bottles labeled with patch labels produced from film structures of Exs. 3 and 7-8 and Comp. Ex. 2 were submerged in a water bath at 65° C. for varying amounts of time. The following results were observed.

| Ex. 3 | 4 (5 minutes) | 5 (8 minutes) | n/a |
|---|---|---|---|
| Ex. 7 | 3 (2 minutes) | 5 (5 minutes) | 5 (8 minutes) |
| Ex. 8 | 4 (3 minutes) | 5 (8 minutes) | n/a |
| CE 2 | 3 (10 minutes) | n/a | n/a |

In addition to the fact that certain skins provides for improved removability of labels, such as PLA skins, it is also observed that the composition or type of adhesive utilized remains a factor in the removability of a label. Use of a particular adhesive can effect label removability, favorably or unfavorably, for a particular type of skin material. The table below demonstrates that for both opaque and clear film embodiments, those embodiments incorporating a PLA adhesive-receiving skin material are removed easier and quicker than the other skin materials tested, regardless of the adhesive composition.

Tests were conducted with National Starchg "ClearLok 5000" and Henkel® 7302M, water-based adhesives. Both are commercially available cold glues. The table below demonstrates that the PLA adhesive-receiving-skin film embodiments provide improved removability for either adhesive, as compared to embodiments having an adhesive-receiving layer that comprises cavitated polypropylene. The same conclusion is supported for both clear and opaque embodiments. Additionally, the PLA skin label removes more quickly than films having the coated skins described below.

Bottles were labeled with film structures according to the following composition:

| EX. # | Film Type | L1 | L2 | L3 | L4 | L5 | L6 |
|---|---|---|---|---|---|---|---|
| | | | | Print Surface | | Adhesive Receiving Layer | |
| 9 | Opaque | 7700 | 4712 | 4712 + 10% EOD + 5% PBT | Admer 1179A | 4042D + 5% Pearl 70 | |
| 10 | Opaque | 7700 | 4712 | 4712 + 10% EOD + 5% PBT | Admer 1179A | 4042D + 5% Pearl 70 | |
| 11 | Opaque | 8573 | 4712 | 4712 + 7% Pearl 2 | 4612 + 50% Pearl 70 | 4612 + 50% Pearl 70 | |
| 12 | Opaque | 8573 | 4712 | 4712 + 7% Pearl 2 | 4612 + 50% Pearl 70 | 4612 + 50% Pearl 70 | |
| 13 | Clear | 4042D + 5% Pearl 70 | Admer 1179A | 4712 + 10% EOD | 4712 | 7700 | |
| 14 | Clear | 8573 | 3371 | 3371 | 3371 | 6573XHC | Acrylic based coating |
| 15 | Opaque | 8573 | 4712 | 4712 + 7% Pearl 2 | 4612 + 50% Pearl 70 | 4612 + 50% Pearl 70 | |
| 16 | Clear | 8573 | 3371 | 3371 | 3371 | 8573 | |
| 17 | Clear | 7701 | 4612 | 4712 + 10% EOD | Admer 1179A | 4042D | |
| 18 | Clear | 8573 | 3371 | 3371 | 3371 | 6573XHC | PVP-VA coating |

8573, 6573XHC, EOD—ethylene-propylene copolymers
4712, 4612, 3371—isotactic polypropylenes
4042D—polylactic acid polymers
Pearl 2, Pearl 70—masterbatches of 30 wt % propylene homopolymer and 70 wt % calcium carbonate ($CaCO_3$)
1179A—maleic anhydride-grafted polypropylene
7700, 7701—ethylene-propylene-butylene terpolymer
PBT—polybutylterephalate
PVP-VA—polyvinylpyrlidene-vinyl acetate Bottles labeled with patch labels produced from film structures of the les as specified in the immediately preceding table were submerged in a caustic (2.5% NaOH) bath at 80-85° C. for up to ten minutes. Label removability was tested at the time intervals indicated in the table below. The following results observed. A score on a scale of from 1 to 5 has been assigned to the observed removability results. A score of 1 indicates that a label is firmly adhered score of 2 means the label is only partially removable. A score of 3 or higher indicates acceptable label removability. A score of 3 means the label is peelable but portions may require some effort for complete removal, 4 means the labels off easily, and 5 indicates that the label has substantially disengaged from bottle.

| Ex #: | Adhesive | 3 minutes | 5 minutes | 7 minutes | 10 minutes |
|---|---|---|---|---|---|
| 9 | Henkel | 2 | 3 | 3 | 3 |
| 10 | ClearLok | 4 | 5 | 5 | 5 |
| 11 | Henkel | 1 | 1 | 2 | 2 |
| 12 | ClearLok | 3 | 4 | 4 | 5 |
| 13 | Henkel | 1 | 1 | 1 | 1 |
| 14 | ClearLok | 2 | 2 | 2 | 3 |
| 15 | ClearLok | 3 | 3 | 4 | 5 |
| 16 | ClearLok | 2 | 3 | 3 | 4 |
| 17 | ClearLok | 3 | 4 | 4 | 4 |
| 18 | PVP-VA | — | 1 | — | 2 |

What is claimed is:

1. A clear polymeric film structure for producing labels that are removable, comprising:

(a) a core layer that has a first side and a second side, wherein the core layer comprises a film-forming thermoplastic polymer;

(b) a first skin layer that has a first side and a second side, wherein the first skin layer comprises polylactic acid polymer (PLA);

(c) a second skin layer that has a first and a second side, wherein the second skin layer comprises a film-forming thermoplastic polymer; and (d) a first tie layer that has a first side and a second side, wherein the first tie layer comprises a film-forming thermoplastic olefin polymer, the first side of the first tie layer is adjacent to the second side of the first skin layer, and the second side of the first tie layer is adjacent to the first side of the core layer;

wherein each layer of the film structure is non-cavitated and the film structure is essentially free of cavitating and opacifying agents and the core layer is located between the first and second skin layers.

2. The film structure of claim 1, wherein an outer surface of the second skin layer is treated with one or more surface treatments selected from the group consisting of flame treatment, corona treatment, plasma treatment, primer coating and metallization.

3. The film structure of claim 1, further comprising:

(e) a second tie layer that has a first side and a second side, wherein the second tie layer comprises a film-forming thermoplastic polymer, the first side of the second tie layer is adjacent to the second side of the core layer, and the second side of the second tie layer is adjacent to the first side of the second skin layer.

4. The film structure of claim 3, wherein the film-forming thermoplastic polymers of layers (a), (c), and (e) are each independently selected from the group consisting of polyolefins.

5. The film structure of claim 3, wherein core layer (a) comprises isotactic polypropylene, second skin layer (c) comprises ethylene-propylene (EP) random copolymer, first tie layer (d) comprises maleic anhydride-grafted polypropylene, and second tie layer (e) comprises isotactic polypropylene.

6. The film structure of claim 3, wherein each of layers (a), (b), (c), (d), and (e) are co-extruded layers.

7. The film structure of claim 3, wherein each of layers (a), (c), (d), and (e) are co-extruded, and layer (b) is coated onto layer (d) as an emulsion or extrusion coating.

8. A label produced from the film structure of claim 1, wherein the label is removable and comprises an adhesive on an outer surface of first skin layer (b).

9. A label, comprising a clear polymeric film structure, comprising:
(a) a core layer that has a first side and a second side, wherein the core layer comprises a film-forming thermoplastic polymer; and
(b) a first skin layer that has a first side and a second side, wherein the first skin layer comprises polylactic acid polymer (PLA); the first skin layer is on one of the sides of the core layer wherein each layer of the film structure is non-cavitated and the film structure is essentially free of cavitating and opacifying agents, wherein the label is removable and comprises an adhesive on an outer surface of the sides of first skin layer (b), and wherein the label is a patch label and the adhesive is a cold-glue adhesive.

10. A label produced from the film structure of claim 3, wherein the label is a patch label that is removable and comprises a cold-glue adhesive on the first side of first skin layer (b).

11. A label produced from the film structure of claim 5, wherein the label is a patch label that is removable and comprises a cold-glue adhesive on the first side of first skin layer (b).

* * * * *